US004001764B2

United States Statutory Invention Registration [19]

[11] Reg. Number: H1764

[45] Published: Dec. 1, 1998

Hotzman et al.

[54] USE OF BENZYLURACILS FOR CONTROLLING WEEDS IN CEREAL CROPS

[75] Inventors: Frederick W. Hotzman, Morrisville, Pa.; James T. Bahr, Hopewell, N.J.

[73] Assignee: FMC Corporation, Philadelphia, Pa.

[21] Appl. No.: 889,754

[22] Filed: Jul. 8, 1997

[51] Int. Cl.[6] ..... A01N 37/00

[52] U.S. Cl. ..... 504/116

[58] Field of Search ..... 504/243

[56] References Cited

U.S. PATENT DOCUMENTS 5,391,541 2/1995 Konz ..... 504/243

FOREIGN PATENT DOCUMENTS

WO97/01543 1/1997 Germany .

*Primary Examiner*—Charles T. Jordan
*Assistant Examiner*—Meena Chelliah
*Attorney, Agent, or Firm*—Donald J. Silvert; I. Robert Silverman

[57] ABSTRACT

This invention relates to a method for controlling the weeds Papever, Matricharia, Viola, and/or Polygonum in cereal crops comprising the step of applying to the locus where the weed control is desired a herbicidal formulation comprised of a benzyluracil having the formula

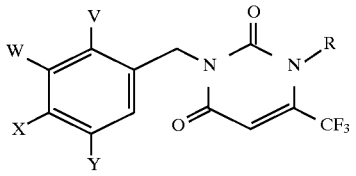

II where V is chlorine; W is chlorine or methoxy; X is hydrogen; Y is chlorine or methoxy; and R is methyl or amino. Preferred benzyluracils are those where R is methyl.

8 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

USE OF BENZYLURACILS FOR CONTROLLING WEEDS IN CEREAL CROPS

BACKGROUND OF THE INVENTION

This invention pertains generally to a method for controlling unwanted plant growth in cereal crops. More particularly, the invention pertains to a method for controlling the weeds Papaver, Matricharia, Viola, and/or Polygonum in cereal crops by applying a compound selected from certain substituted benzyluracils to the locus where the weed control is desired. In particular, the invention pertains to a method for controlling such weeds by applying to the locus the benzyluracil 1-substituted-3-(2,5-dichloro-3-methoxyphenylmethyl)-6-trifluoromethyl-2,4-(1H, 3-pyrimidinedione or 1-substituted -3-(2,3-dichloro-5-methoxyphenylmethyl)-6-trifluoromethyl-2,4-(1H, 3H)-pyrimidinedione where the 1-substituent is a methyl or amino. The benzyluracils unexpectedly control the weeds of each genus at use rates that are not harmful to cereal crops such as wheat.

Certain herbicides are known to exert their herbicidal activity by inhibiting the enzyme protoporphyrinogen oxidase which is also referred to as PPO. PPO is an enzyme necessary for porphyrin synthesis in the biosynthetic pathway to chlorophyll in plants. In susceptible plant species PPO inhibition ultimately disrupts the cell membrane and causes desiccation. As a herbicide class PPO inhibitors have been found to be highly effective for the control of Galium and Veronica weed species, but generally have not been found to control other weeds that are commonly found in cereals such as Papaver, Matricharia, Viola, and Polygonum. The high use rates that are normally required of PPO inhibitors to control these weeds usually cause unacceptable damage to the cereal crop for which the protection is sought. This activity and selectivity profile for PPO inhibitors generally is exemplified by FMC's carfentrazone-ethyl which is described in U.S. Pat. No. 5,125,958

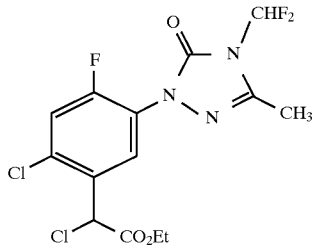

carfentrazone-ethyl

More recently, U.S. Pat. No. 5,391,541 reported the herbicidal efficacy of certain benzyluracils which are also PPO inhibitors. These compounds are represented by formula I:

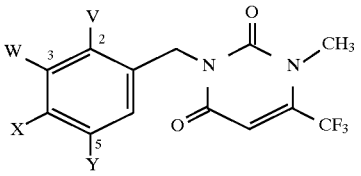

I

The compounds of formula I were reported in the '541 patent to be useful against a variety of weed species that occur in cereal crops, but their is no disclosure concerning the use of the compounds against Papaver, Matricharia, Viola, or Polygonum weeds. Surprisingly, it has now been found that certain benzyluracils can be used effectively to control Papaver, Matricharia, Viola, and/or Polygonum weeds in cereal crops such as wheat, barley, oats, and rye. These benzyluracils have been found to display selectivity by controlling the weeds of each genus at use rates which cause relatively little damage to the cereal crop for which protection is sought.

SUMMARY OF THE INVENTION

An effective method has now been found for controlling the weeds Papaver, Matricharia, Viola, and/or Polygonum in cereal crops by applying certain benzyluracils to the locus where the weed control is desired. The beznyluracils are represented by formula II shown below.

DETAILED DESCRIPTION OF THE INVENTION

This invention relates to a method for controlling the weeds Papaver, Matricharia, Viola, and/or Polygonum in cereal crops comprising the step of applying to the locus where the weed control is desired an herbicidally effective amount of a composition comprised of a benzyluracil having the formula

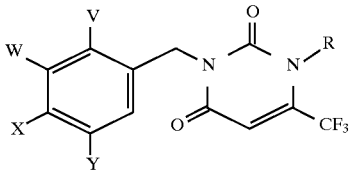

II where V is chlorine; W is chlorine or methoxy; X is hydrogen; Y is chlorine or methoxy; and R is methyl or amino, in an admixture with an agriculturally acceptable carrier. Preferred benzyluracils are those where R is methyl. More preferred benzyluracils are those where (*a*) V and Y are chlorine, W is methoxy, and R is methyl; and (*b*) V and W are chlorine, Y is methoxy, and R is methyl.

The method of this invention is useful for controlling the weeds Papaver, Matricharia, Viola, and/or Polygonum. Certain species of these weeds are also known by the following common names and abbreviations.

| Common Name | Species Name | Abbreviations |
|---|---|---|
| Field violet | *Viola arvensis* | Vioar |
| False chamomile | *Matricaria maritima* | Matma |
| Scentless chamomile | *Matricaria inodora* | Matin |
| Wild buckwheat | *Polygonum convolvulus* | Polco |
| Kochia | *Kochia scoparia* | Kchsc |
| Poppy corn | *Papaver rhoeas* | Paprh |

TABLE 1

Benzyluracils

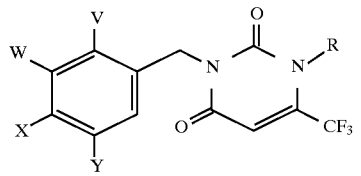

| No. | V | W | X | Y | R |
|---|---|---|---|---|---|
| 1 | Cl | Cl | H | $OCH_3$ | $CH_3$ |
| 2 | Cl | $OCH_3$ | H | Cl | $CH_3$ |
| 3 | Cl | Cl | H | $OCH_3$ | $NH_2$ |
| 4 | Cl | $OCH_3$ | H | Cl | $NH_2$ |

The Benzyluracils may be prepared as described in U.S. Pat. No. 5,391,541 (where R is methyl) or as described in International patent application publication No. WO 97/01, 543 (where R is amino).

Herbicidal compositions are prepared by combining herbicidally effective amounts of the benzyluracils with adjuvants and carriers normally employed in the art for facilitating the dispersion of active ingredients for the particular utility desired, recognizing the fact that the formulation and mode of application of the herbicide may affect its activity in a given application. Useful formulations include, but are not limited to, granules, emulsifiable concentrates, emulsifiable flowables, solutions, dispersions, wettable powders, suspensions, and suspension concentrates. A typical 5% (50 g benzyluracil/L) suspension concentrate (SC) shown in Table 2 was used in the testing of the present method.

TABLE 2

SC Formulation

| Component | Percent Weight/Weight |
|---|---|
| Active Ingredient (99%) | 5.05 |
| Antimicrobial agent | 0.05 |
| Antifoaming agent | 0.10 |
| Emulsifier | 2.60 |
| Wetting agent | 0.40 |
| Thickening agent 1 | 0.45 |
| Thickening agent 2 | 0.35 |
| Propylene Glycol | 6.00 |
| Water | 85.0 |

The present method may be used generally to control the weeds Papaver, Matricharia, Viola, and/or Polygonum in cereal crops that are not significantly damaged at the use rates which are effective against the weeds. The method may also be used to control species of Veronica such as *Veronica persica* (field speedwell), Galium spp. such as *Galium aparine* (catchweed bedstraw), Kochia spp. such as *Kochia scoparia,* and Sinapis spp. such as *Sinapis arvensis* (wild mustard). The cereal crops that may be treated according to the present method include, but are not limited to, wheat, barley, oats, and rye. It should be noted that to obtain selective control of the weeds in barley it is preferable not to use a non-ionic surfactant as an adjuvant in the herbicidal composition.

The amount of benzyluracil that is required to be herbicidally effective for a given weed will vary depending on formulation, mode of application and variations in field conditions. Generally, an herbicidally effective amount of benzyluracil is in the range of about 20 to 120 grams per hectare (g/ha). A preferred amount of benzyluracil is in the amount of 40 to 70 grams per hectare.

Testing

The herbicidal formulations were evaluated against weed species that are important grass and broadleaf weeds found in cereal crops in both North America and Europe.

1. Planting

Cereal and weed species were planted in 4 inch standard plastic pots containing about 550 ml of pasteurized, sieved loam soil that has 1.2% organic matter and a pH of 6 and covered about 1 cm with a mixture of soil:sand(1:1 v:v). Table 3 shows the treatment schedule for the crop and weed species which includes the quantity of seeds (cc) and the interval between planting and chemical applications (interval). Both the quantity and the interval may be adjusted depending on the quality of seed lot.

TABLE 3

Plant Species and Treatment Schedule

| Common Name | Scientific Name | Seeds (cc) | Interval (weeks) |
|---|---|---|---|
| Barley | *Hordeum vulgare* | 1.0 | 2 |
| Wheat | *Triticum aestivum* | 0.7 | 2 |
| Wild Oat | *Avena fatua* | 10 seeds | 2 |
| Common chickweed | *Stellaria media* | 0.15 | 3 |
| Field violet | *Viola arvensis* | 2.2 | 4 |
| Scentless chamomile | *Matricaria inodora* | 0.7 | 3 |
| Wild buckwheat | *Polygonum convolvulus* | 0.5 | 3 |
| Wild mustard | *Sinapis arvensis* | 0.3 | 2 |

Seeds were measured using a graduated powder measure or by counting the number of seeds. About 90 pots of each species were planted to allow for replication and untreated controls. Pots were then placed in a growth chamber set at 20/15 ° C. (day time/night time temperature) with a diurnal day/night cycle of 14/8 h.

2. Dilution

The benzyluracils as technical chemicals were diluted in a base of acetone:water (1:1) with Tween® 20 (0.25% v:v). The appropriate quantity of technical was first dissulved in 80 ml acetone:Tween® and then 80 ml water:Tween® 20 was added. Samples were serially diluted by removing an 80 ml aliquot and adding it to 80 ml base to achieve the desired application rate.

3. Application

One of each plant species was placed into two separate 21 by 12 inch plastic carrying trays. Both trays were placed on a movable belt sprayer which had been calibrated to deliver 1000 L of spray/HA. The sprayer was equipped with Tee-Jet® 8004E SS nozzle, 50 mesh screen, and diagram check assemble. Spray pressure was 40 psi. The nozzle height was set at a minimum height of 10 ½ inches above the weed canopy. The benzyluracils formulated as described above were sprayed in sequence from the high rate to low rate. With each new chemical sample, the sprayer body was triple rinsed, twice with acetone and once with water.

4. Experimental Design

The treatments were arranged as a split-plot design with chemicals as the main plot and rates as the subplot. Crop and weed species were set on growth chamber carts by chemical. Species were aligned in a column with the untreated controls in the back of the cart. The foliage of plants were not wetted for about 24 h after chemical applications. Thereafter, plants were watered as needed to provide for optimum growth.

5. Crop Tolerance and Efficacy

Crop and weed species were visually evaluated for effect using a 0 to 100% scale where 0% is no green biomass reduction and 100% is total biomass reduction or complete kill. Crops were evaluated at 7 and 21 days after treatment (DAT), while weeds were evaluated only at 21 DAT.

Table 4 shows comparative growth chamber testing of selected benzyluracils alongside carfentrazone-ethyl. For the growth chamber testing, the benzyluracils were used as technical material. In the table, carfentrazone-ethyl is identified as "carf", and compound numbers "1" and "2" are as described in Table 1.

TABLE 4

Herbicidal Activity of Benzyluracils on Weeds in Growth Chamber

| Cmpd | Rate | % Control | | | |
|---|---|---|---|---|---|
| No. | g/Ha | TRIAE[2] | MATIN | VIOAR | POLCO |
| Carf | 4 | 15 | 5 | 70 | 55 |
| 1 | 4 | 20 | 15 | 98 | 85 |
| 2 | 4 | 5 | 20 | 88 | 70 |
| Carf | 8 | 30 | 20 | 50 | 63 |
| 1 | 8 | 33 | 33 | 96 | 99 |
| 2 | 8 | 12 | 43 | 97 | 84 |
| Carf | 16 | 43 | 23 | 80 | 83 |
| 1 | 16 | 40 | 48 | 99 | 99 |
| 2 | 16 | 17 | 50 | 100 | 93 |
| Carf | 32 | 55 | 40 | 84 | 93 |
| 1 | 32 | 45 | 70 | 100 | 99 |
| 2 | 32 | 30 | 55 | 100 | 97 |
| Carf | 64 | 68 | 58 | 87 | 99 |
| 1 | 64 | 60 | 97 | 100 | 100 |
| 2 | 64 | 43 | 63 | 100 | 99 |
| Carf | 128 | 80 | 95 | 100 | 100 |
| 1 | 128 | 70 | 98 | 100 | 100 |
| 2 | 128 | 45 | 98 | 100 | 98 |

Notes:
[1]Percent control is the average of two runs for rates 8, 16, 32, and 64 g/Ha. Percent control is taken from one run for rates 4 and 128 g/Ha.
[2]Injury to wheat at seven rather than 21 days.
TRIAE, wheat; MATIN, false chamomile; VIOAR, field violet; POLCO, wild buckwheat.

The weeds Matricharia, Viola, and Polygonum are represented by the last three columns respectively in Table 4. The results show the superior selectivity of the benzyluracils when compared to carfentrazone-ethyl for controlling these weeds relative to damaging the wheat in growth chamber testing. Overall the best selectivity was observed with Compound 2, 1-methyl-3-(2,5-dichloro-3-methoxyphenylmethyl)-6-trifluoromethyl-2,4-(1H, 3H)-pyrimidinedione.

Compound 2 and carfentrazone-ethyl were also compared under field conditions. For field testing carfentrazone-ethyl was formulated as 40% water dispersible granule and compound 2 was formulated as a 5% suspension concentrate. The field testing results showed that the benzyluracils provide significant control (>70%) of the Papaver, Matricharia, and Viola weeds at use rates in the range of 20 to 120 g/ha that are generally safe to wheat. In contrast, carfentrazone-ethyl is much less effective in controlling these weeds at use rates where the wheat is little effected.

It is apparent that various modifications may be made in the formulations and application of the compounds of the present invention without departing from the inventive concepts herein, as defined in the claims.

We claim:

1. A method for controlling one or more of the weeds Papaver, Matricharia, Viola and Polygonum in a cereal crop comprising the step of applying to a locus where the weed control is desired an herbicidally effective amount of a composition comprising a benzyluracil having the formula

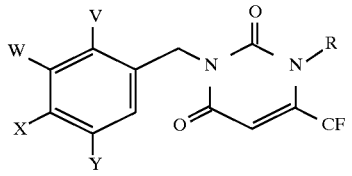

where V is chlorine; X is hydrogen; R is methyl or amino; W is chlorine when Y is methoxy and W is methoxy when Y is chlorine in an admixture with an agriculturally acceptable carrier.

2. The method of claim 1 where R is methyl.

3. The method of claim 1 wherein the cereal crop is one of wheat, barley, oats and rye.

4. The method of claim 3 wherein the cereal crop is wheat.

5. The method of claim 1, 2, 4, or 3 wherein the weed is Papaver.

6. The method of claim 1, 2, 4, or 3 wherein the weed is Viola.

7. The method of claim 1 wherein the benzyluracil has the formula

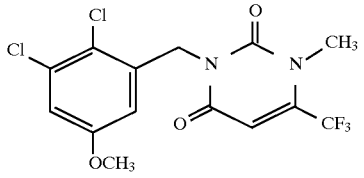

8. The method of claim 1 wherein the benzyluracil has the formula

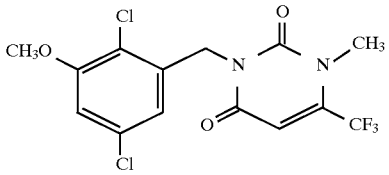

* * * * *